US012460477B2

(12) United States Patent
Lin

(10) Patent No.: US 12,460,477 B2

(45) Date of Patent: Nov. 4, 2025

(54) WINDOW COVERING

(71) Applicant: Whole Space Industries LTD, Taipei (TW)

(72) Inventor: Tzu-Yen Lin, Taipei (TW)

(73) Assignee: Whole Space Industries Co., LTD, Taipei (TW)

(*) Notice: Subject to any disclaimer, the term of this patent is extended or adjusted under 35 U.S.C. 154(b) by 378 days.

(21) Appl. No.: 18/181,253

(22) Filed: Mar. 9, 2023

(65) Prior Publication Data

US 2023/0313608 A1 Oct. 5, 2023

Related U.S. Application Data

(60) Provisional application No. 63/324,806, filed on Mar. 29, 2022.

(51) Int. Cl.

*E06B 9/60* (2006.01)
*E06B 9/40* (2006.01)
*E06B 9/80* (2006.01)
*E06B 9/90* (2006.01)

(52) U.S. Cl.

CPC .................. *E06B 9/60* (2013.01); *E06B 9/40* (2013.01); *E06B 9/80* (2013.01); *E06B 2009/905* (2013.01)

(58) Field of Classification Search

CPC ........ E06B 2009/905; E06B 9/60; E06B 9/40; E06B 9/80; E06B 9/54; E06B 9/42; E06B 9/56

See application file for complete search history.

(56) References Cited

U.S. PATENT DOCUMENTS

| | | | |
|---|---|---|---|
| 13,251 | A | 7/1855 | Bixler |
| 2,580,253 | A | 12/1951 | Stuber et al. |
| 2,586,340 | A | 2/1952 | Hyde |

(Continued)

FOREIGN PATENT DOCUMENTS

| | | | | |
|---|---|---|---|---|
| CN | 110043180 A * | 7/2019 | .............. | E06B 9/40 |
| KR | 101050864 B1 * | 7/2011 | | |
| WO | WO-2021174285 A1 * | 9/2021 | .............. | E06B 9/50 |

OTHER PUBLICATIONS

Machine translation KR101050864 (Year: 2011).*
Machine translation CN110043180 (Year: 2019).*

*Primary Examiner* — Daniel P Cahn
*Assistant Examiner* — Jeremy C Ramsey
(74) *Attorney, Agent, or Firm* — Buchanan Ingersoll & Rooney PC

(57) ABSTRACT

A window covering includes a positional adjustment mechanism. The positional adjustment mechanism can be utilized to adjust a position of window covering material or lift cords passed through and/or connected to such material for positional adjustment of the window covering material between a fully retracted position and a fully extended position. A tension adjustment mechanism for the window covering positional adjustment mechanism can be configured to permit a user to adjust an amount of force that may be needed to be applied to a bottom rail or the window covering material to effect a raising or lowering of the window covering material to provide a more desired level of precision in the height adjustment of the window covering material. A resistance mechanism can also (or alternatively) be provided to provide additional drag force to improve precision in height adjustment.

18 Claims, 10 Drawing Sheets

(56) References Cited

U.S. PATENT DOCUMENTS

| | | | | |
|---|---|---|---|---|
| 2,678,094 | A | 5/1954 | Sargent | |
| 3,921,695 | A | 11/1975 | Debs | |
| 4,096,904 | A * | 6/1978 | Donofrio | E06B 9/90 160/326 |
| 4,507,831 | A | 4/1985 | McClure | |
| 4,522,245 | A | 6/1985 | Anderson | |
| 4,681,279 | A | 7/1987 | Nakamura | |
| 4,884,618 | A * | 12/1989 | Steeves | E06B 9/60 160/321 |
| 4,955,248 | A | 9/1990 | Lindstrom | |
| 5,002,113 | A | 3/1991 | Georgopoulos | |
| 5,092,387 | A | 3/1992 | King et al. | |
| 5,167,269 | A * | 12/1992 | Abo | E06B 9/90 160/321 |
| 5,186,229 | A | 2/1993 | Hsu | |
| 5,396,945 | A | 3/1995 | Meyer | |
| 6,308,764 | B1 | 10/2001 | Lin | |
| 6,325,133 | B1 | 12/2001 | Lin | |
| 6,474,394 | B2 | 11/2002 | Kuhar | |
| 6,991,020 | B1 | 1/2006 | Cheng et al. | |
| 7,950,437 | B2 | 5/2011 | Lin | |
| 8,132,610 | B2 | 3/2012 | Lin | |
| 8,511,363 | B2 | 8/2013 | Lin | |
| 8,910,696 | B2 | 12/2014 | Wen et al. | |
| 9,376,859 | B1 | 6/2016 | DeWard et al. | |
| 9,382,753 | B2 | 7/2016 | Lin | |
| 9,719,295 | B2 | 8/2017 | Lin | |
| 10,138,676 | B2 * | 11/2018 | Bohlen | E06B 9/90 |
| 10,151,142 | B2 | 12/2018 | Lin | |
| 10,329,836 | B2 | 6/2019 | Lin | |
| 10,415,306 | B2 | 9/2019 | Lin | |
| 10,550,635 | B2 | 2/2020 | Lin | |
| 10,676,988 | B2 | 6/2020 | Lin | |
| 10,975,618 | B2 | 4/2021 | Lin | |
| 2011/0155332 | A1 * | 6/2011 | Chen | E06B 9/42 160/291 |
| 2011/0277943 | A1 | 11/2011 | Lin | |
| 2012/0132373 | A1 | 5/2012 | Lin | |
| 2013/0048233 | A1 | 2/2013 | Lin | |
| 2013/0091968 | A1 | 4/2013 | Lin | |
| 2013/0220561 | A1 | 8/2013 | Yu et al. | |
| 2013/0248125 | A1 | 9/2013 | Lin | |
| 2014/0000819 | A1 * | 1/2014 | Mullet | E06B 9/60 160/311 |
| 2017/0218700 | A1 | 8/2017 | Lin | |
| 2021/0156196 | A1 * | 5/2021 | Tao | E06B 9/42 |

* cited by examiner

WINDOW COVERING

CROSS-REFERENCE TO RELATED APPLICATIONS

This application claims priority to U.S. Provisional Application No. 63/324,806, filed on Mar. 29, 2022. The entirety of this provisional patent application is incorporated by reference herein.

FIELD OF INVENTION

The present innovation relates to window coverings. For example, the present innovation relates to window coverings, a position control mechanisms for window coverings, a tension adjustment mechanism for a positional control mechanism of a window covering, a resistance mechanism for a window covering positional adjustment mechanism, and methods of making and using embodiments of such window coverings and such mechanisms.

BACKGROUND OF THE INVENTION

Window coverings can be configured so that a material is moveable to partially or fully cover a window. Examples of such window coverings can be appreciated from U.S. Pat. Nos. 10,151,142, 9,719,295, 9,382,753, 9,376,859, 8,910,696, 8,511,363, 8,132,610, 6,325,133, 6,308,764, 5,396,945, 5,186,229, 5,092,387, 5,002,113, 4,955,248, 4,681,279, 4,522,245, 4,507,831, 4,096,904, 3,921,695, 2,678,094, 2,586,340, 2,580,253, and 13,251 and U.S. Patent Application Publication Nos. 2017/0218700, 2013/0091968, 2013/0220561, 2013/0048233, and 2012/0132373.

Some types of window coverings can provide a cordless height adjustment. Such devices can utilize a cordless spring motor, for example. Examples of cordless window coverings can be appreciated from U.S. Pat. Nos. 13,251, 6,474,394, 6,991,020, 7,950,437, 10,329,836, 10,415,306, 10,550,635, 10,676,988, and 10,975,618 and U.S. Patent Application Publication Nos. 2011/0277943, 2013/0248125.

SUMMARY OF THE INVENTION

I have determined that a new window covering design is needed that can permit effective adjustment of window covering material while also permitting a user to be able to adjust the amount of force required to adjust the position of the window covering material of the window covering. Such adjustability can permit a user to adapt the window covering to a particular user preference and also allow the same lift system to be used in connection with various different types of window covering materials that may have significantly different weights that may need to be balanced when raising or lowering the window covering material.

A window covering can include a rotatable roller rotatable in a first rotational direction and a second rotational direction. The rotatable roller can be mountable adjacent to a window. Window covering material can be attached to the rotatable roller such that rotation of the rotatable roller in the first rotational direction extends the window covering material from the rotatable roller toward a fully extended position and rotation of the rotatable roller in the second rotational direction retracts the window covering material toward a fully retracted position. A positional adjustment mechanism can be positioned in the rotatable roller. The positional adjustment mechanism can have a spring and can also include one or more of: (i) a resistance mechanism configured to apply an extension drag force to the rotatable roller during rotation in the first rotational direction and a retraction drag force to the rotatable roller during rotation in the second rotational direction, and (ii) a tension adjustment mechanism connected to the spring of the positional adjustment mechanism to adjust a pre-tension of the spring from between a first tension position and a second tension position where the second tension position is a higher tension position than the first tension position.

Embodiments can be configured so that the positional adjustment mechanism only has (i) the resistance mechanism configured to apply an extension drag force to the rotatable roller during rotation in the first rotational direction and a retraction drag force to the rotatable roller during rotation in the second rotational direction. Other embodiments can be configured so that the positional adjustment mechanism only has (ii) the tension adjustment mechanism connected to the spring of the positional adjustment mechanism to adjust the pre-tension of the spring from between the first tension position and the second tension position that is a higher tension position than the first tension position. Yet other embodiments can include a positional adjustment mechanism that includes both feature (i) and feature (ii) (e.g. can include both the resistance mechanism and the tension adjustment mechanism).

In some embodiments that utilize the tension adjustment mechanism, the tension adjustment mechanism can include a rotatable actuator that is rotatable to adjust the pre-tension of the spring from between the first tension position and the second tension position. Rotation of the actuator in a first direction can adjust the pre-tension of the spring toward the first tension position and rotation of the actuator in a second direction can adjust the pre-tension of the spring toward the second tension position. At least one torsion spring can be positioned between the actuator and the spring of the positional adjustment mechanism to effect adjustment of the pre-tension of the spring via rotation of the actuator. The at least one torsion spring of the tension adjustment mechanism can be connected to a moveable collar that is moved via rotation of the actuator to adjust the pre-tension of the spring of the positional adjustment mechanism.

Some embodiments that utilize the resistance mechanism can be configured so that the tension mechanism includes a housing, a first torsion spring within an inner passageway of the housing, a first torsion spring support on which the first torsion spring is positionable within the inner passageway, at least one second torsion spring, and a second torsion spring support on which the at least one second torsion spring is positioned such that the at least one second torsion spring is between the second torsion spring support and the first torsion spring support and the first torsion spring support is between the first torsion spring and the at least one second torsion spring. The at least one second torsion spring can have a tang that is positionable within a slot of the first torsion spring support and can be moveable within the slot of the first torsion spring support between an engaged position and a disengaged position. The at least one first torsion spring can also have a tang that is positionable within a slot of the housing and is moveable within the slot of the housing between an engaged position and a disengaged position. The at least one second torsion spring can be movable to the engaged position of the at least one second torsion spring and the first torsion spring can be moveable to the disengaged position of the first torsion spring when the rotatable roller rotates in the first rotational direction to extend the window covering material. The at least one second torsion spring can be movable to the disengaged position of the at least one second torsion spring and the first torsion spring can be moveable to the engaged position of the first torsion spring when the rotatable roller rotates in the second rotational direction to retract the window covering material.

The retraction drag force can be applied via the first torsion spring during rotation of the rotatable roller in the second rotational direction and the extension drag force can be applied via the at least one second torsion spring during rotation of the rotatable roller in the first rotational direction. The extension drag force can be greater than the retraction drag force.

A window covering positional adjustment mechanism positionable in a rotatable roller, can also be provided. The positional adjustment mechanism can include a coil spring and at least one of: (i) a resistance mechanism positionable within the rotatable roller and configured to apply an extension drag force to the rotatable roller during rotation of the rotatable roller in a first rotational direction and a retraction drag force to the rotatable roller during rotation of the rotatable roller in a second rotational direction and (ii) a tension adjustment mechanism connected to the coil spring of the positional adjustment mechanism to adjust a pre-tension of the coil spring from between a first tension position and a second tension position that is a higher tension position than the first tension position.

Embodiments can be provided such that the positional adjustment mechanism includes the resistance mechanism and the tension adjustment mechanism or only includes one of these mechanisms. For instance, some embodiments can include only the resistance mechanism while other embodiments can include only the tension mechanism. Yet other embodiment can include both the resistance mechanism and the tension adjustment mechanism.

In embodiments that utilize the tension adjustment mechanism, this mechanism can include different elements. For instance, the tension adjustment mechanism can include a rotatable actuator that is rotatable to adjust the pre-tension of the coil spring from between the first tension position and the second tension position. Rotation of the actuator in a first direction can adjust the pre-tension of the coil spring toward the first tension position and rotation of the actuator in a second direction can adjust the pre-tension of the coil spring toward the second tension position.

At least one torsion spring can be positioned between the actuator and the coil spring of the positional adjustment mechanism to effect adjustment of the pre-tension of the coil spring via rotation of the actuator. For example, the at least one torsion spring of the tension adjustment mechanism can be connected to a moveable collar that is moved via rotation of the actuator to adjust the pre-tension of the coil spring of the positional adjustment mechanism.

Embodiments that utilize the resistance mechanism can include a resistance mechanism that has different elements. For instance, the resistance mechanism can include a housing, a first torsion spring within an inner passageway of the housing, a first torsion spring support on which the first torsion spring is positionable within the inner passageway, at least one second torsion spring, and also a second torsion spring support on which the at least one second torsion spring is positioned such that the at least one second torsion spring is between the second torsion spring support and the first torsion spring support and the first torsion spring support is between the first torsion spring and the at least one second torsion spring.

The at least one second torsion spring can have a tang that is positionable within a slot of the first torsion spring support that is also moveable within the slot of the first torsion spring support between an engaged position and a disengaged position. The at least one first torsion spring can also have a tang that is positionable within a slot of the housing and is moveable within the slot of the housing between an engaged position and a disengaged position. The at least one second torsion spring can be movable to the engaged position of the at least one second torsion spring and the first torsion spring can be moveable to the disengaged position of the first torsion spring when the rotatable roller rotates in a first rotational direction to extend the window covering material. Also, the at least one second torsion spring can be movable to the disengaged position of the at least one second torsion spring and the first torsion spring can be moveable to the engaged position of the first torsion spring when the rotatable roller rotates in a second rotational direction to retract the window covering material.

The retraction drag force can be applied via the first torsion spring during rotation of the rotatable roller in the second rotational direction and the extension drag force can be applied via the at least one second torsion spring during rotation of the rotatable roller in the first rotational direction. The extension drag force can be greater than the retraction drag force.

Other details, objects, and advantages of the window covering, window covering positional adjustment mechanism, a tension adjustment mechanism for a window covering positional adjustment mechanism, a resistance mechanism for a window covering positional adjustment mechanism, and methods of making and using the same will become apparent as the following description of certain exemplary embodiments thereof proceeds.

BRIEF DESCRIPTION OF THE DRAWINGS

Exemplary embodiments of the window covering, window covering positional adjustment mechanism, a tension adjustment mechanism for a window covering positional adjustment mechanism, a resistance mechanism for a window covering positional adjustment mechanism, and methods of making and using the same are shown in the accompanying drawings. It should be understood that like reference numbers used in the drawings may identify like components.

DETAILED DESCRIPTION OF EXEMPLARY EMBODIMENTS

Figure 1:
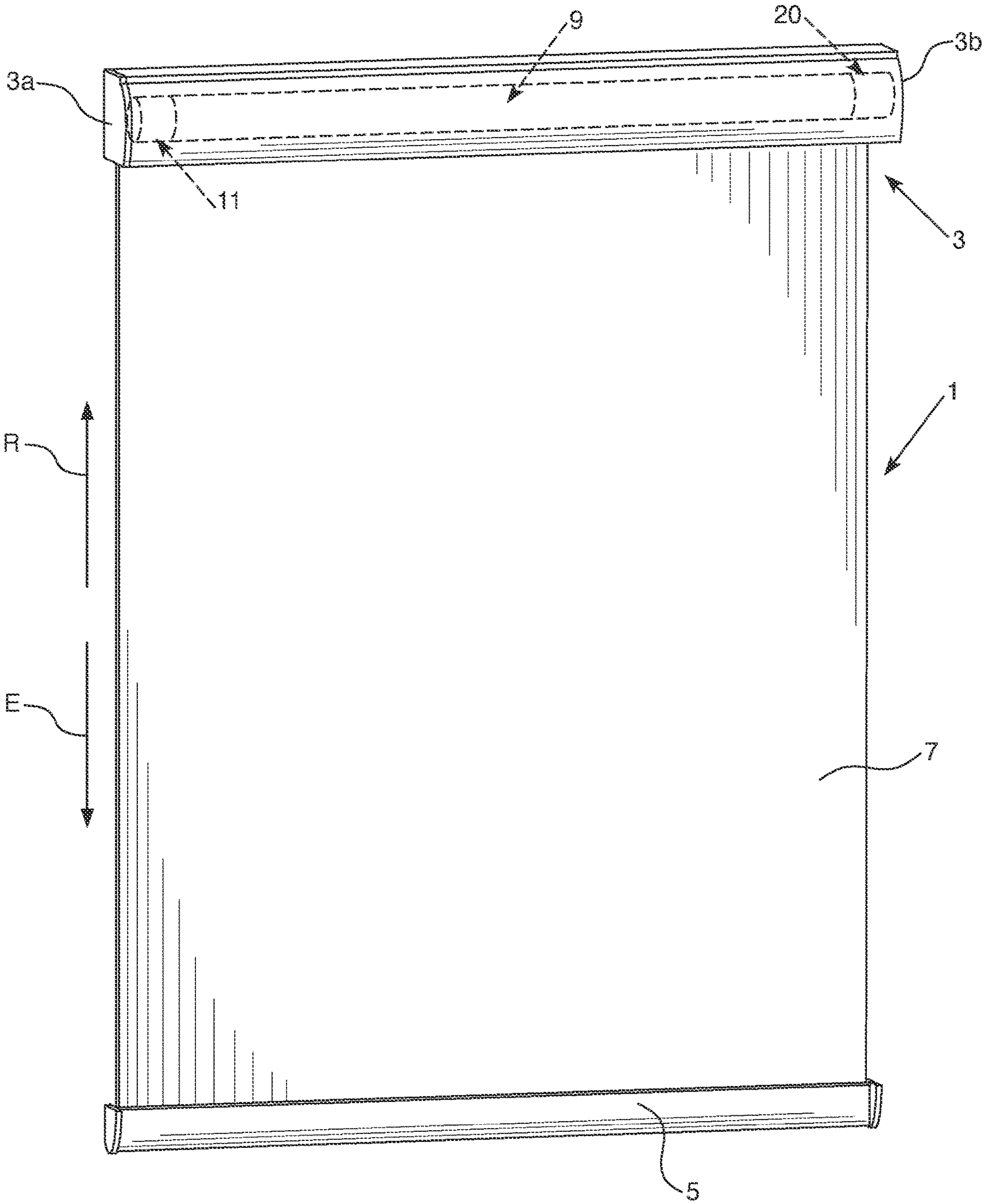
FIG. 1 is a perspective view of a first exemplary embodiment of a window covering.
Figure 2:
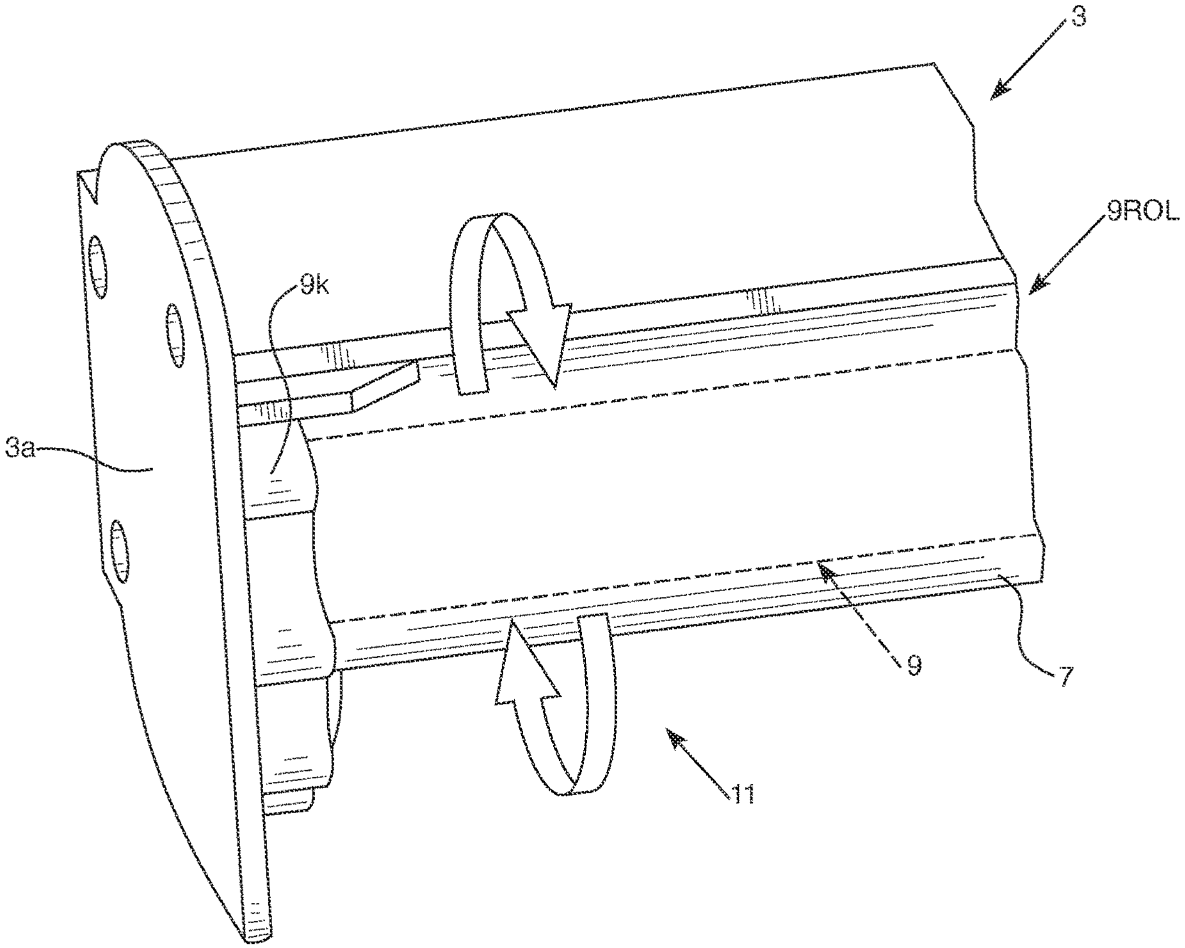
FIG. 2 is a fragmentary view of the first exemplary embodiment of a window covering illustrating an exemplary embodiment of a tension adjustment mechanism of the window covering positional adjustment mechanism of the window covering.

As can be appreciated from FIGS. 1-13, embodiments of my window covering 1 can include a mounting assembly that can include a first bracket 3*a* and a second bracket 3*b* for mounting a rotatable roller from which window covering material is extendable and retractable. The mounting assembly can be configured to mount the window covering near or adjacent a window. In some embodiments, the mounting assembly can also include a headrail that can be attached to the first and second brackets 3*a*, 3*b*.

Window covering material 7 can be wound about a rotatable roller 9ROL of a positional adjustment mechanism 9 connected to the brackets 3*a* and 3*b* and/or headrail for adjusting the position of the window covering 1 from between a fully retracted (or open) position and a fully extended (or closed) position. The rotatable roller 9ROL can be structured as a tube, a hollow shaft or other type of roller 9ROL. The rotatable roller 9ROL can be rotated in a first rotational direction for extension of the window covering material in an extension direction E or can be rotated in a second rotational direction opposite the first rotational direction to retract the window covering material in a retraction direction R. During retraction, the window covering material 7 can be wound upon the roller 9ROL. During extension, the window covering material 7 can be unwound from the roller 9ROL.

In some embodiments, one or more lift cords can extend from the positional adjustment mechanism and pass through the window covering material for retracting and extending the window covering material. The lift cords can be connected to the rotatable roller or can be connected to at least one spring motor or spring motor assembly of the positional adjustment mechanism 9.

A second rail 5 can be connected to a bottom portion or lower portion of the window covering material 5. The second rail 5 can be a bottom rail or a middle rail of a top down bottom up shade. The second rail 5 can be directly affixed to the lower portion or bottom of the window covering material 7 or can be connected to lift cords passed through the window covering material 7 for attachment to the second rail 5.

The positional adjustment mechanism 9 can include a tension adjustment mechanism 11, a spring 9*s*, and a resistance mechanism 20 that are positionable within the rotatable roller 9ROL. The tension adjustment mechanism 11 can be attached to a first end of the positional adjustment mechanism 9 near or adjacent to the first bracket 3*a* and the resistance mechanism 20 can be attached to the second end of the positional adjustment mechanism near or adjacent the second bracket 3*b*. The spring 9*s* can be a coil spring 9CS that is positioned between the resistance mechanism 20 and the tension adjustment mechanism 11. A non-moving shaft 9*r* can be positioned through the roller 9ROL and can be attached to the tension adjust The tension adjustment mechanism 11 can include an actuator 9*k* that is positioned outside of a side of the roller 9ROL adjacent the first bracket 3*a* and can be rotatable by a user (e.g. manually rotatable) in opposite rotational directions to adjust an amount of pre-tension of a spring 9*s* of the positional adjustment mechanism to adjust the force exerted by that spring 9*s* for maintaining a position of the window covering material and to retract the window covering material. The axis of rotation for the actuator 9*k* can be parallel to the axis about which the roller 9ROL rotates for retracting and extending the window covering material 7.

The spring 9*s* can be a coil spring 9CS that extends from its first end to its second end to define a central opening through which a shaft 9*r* is positionable. The pre-tension of the spring 9*s* can be adjustable between a high tension position and a low tension position that also permits the pre-tension of the spring 9*s* to be adjusted to one or more intermediate tension positions between the high and low tension positions.

The resistance mechanism 20 can be configured to apply a drag force during motion of the rotatable roller 9ROL of the positional adjustment mechanism 9 to provide additional drag force during lowering or raising of the window covering material to provide improved precision when adjusting a position of the window covering material 7. The resistance mechanism 20 can be configured to provide a higher level of drag force during extension (or lowering) of the window covering material and provide a lower level of drag force during retraction (or raising) of the window covering material 7.

Figure 3:
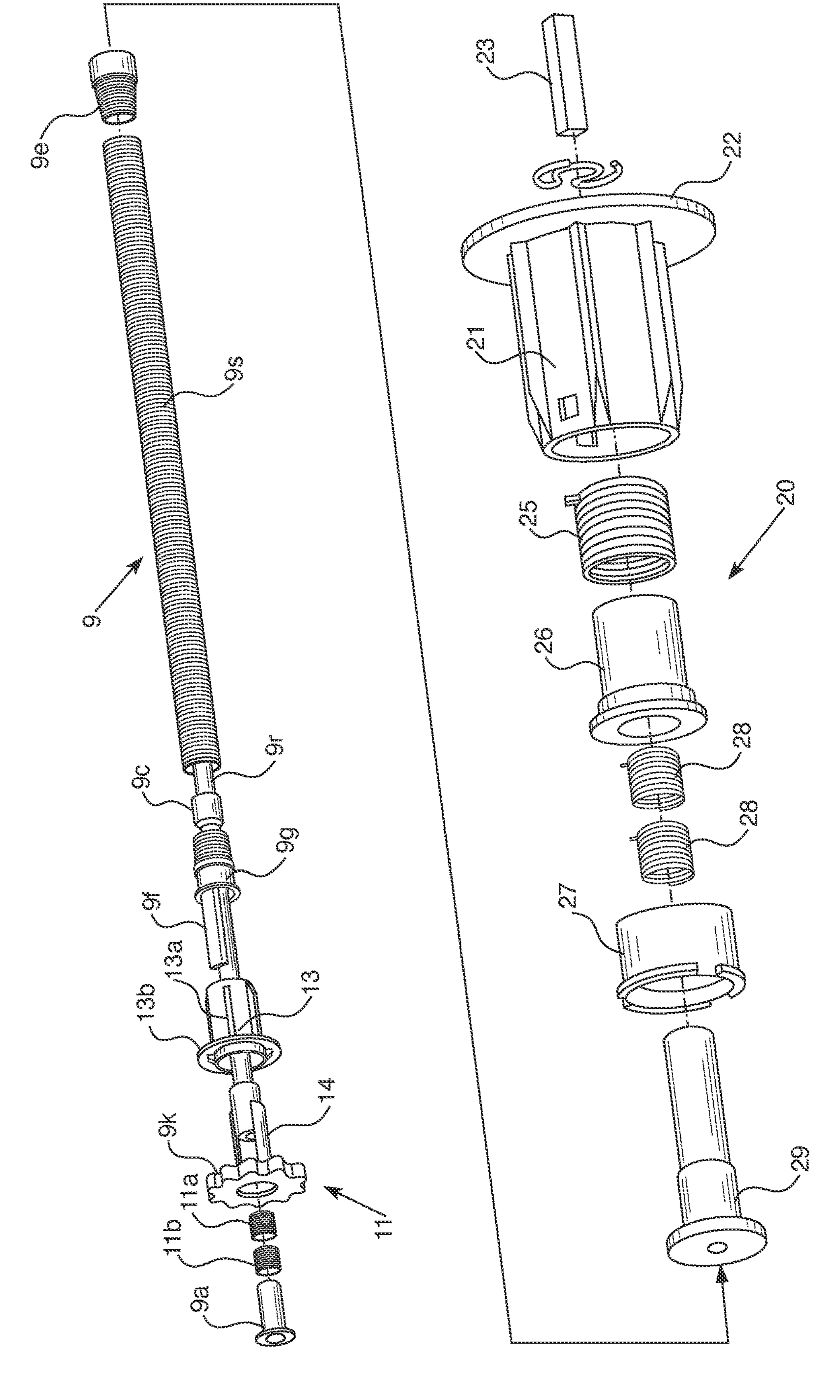
FIG. 3 is an exploded view of the exemplary embodiment of the window covering positional adjustment mechanism of the first exemplary embodiment of the window covering.

As can be appreciated from FIG. 3, the positional adjustment mechanism 9 can include the tension adjustment mechanism 11 and the resistance mechanism 20. The tension adjustment mechanism 11 can be positioned between the first bracket 3*a* and a first end of the spring 9*s* that is positionable on and/or around a shaft 9*r*, which can be a rod, a bar, or other type of shaft that can be positioned within the inner channel or cavity of the rotatable body of the roller 9ROL. The resistance mechanism 20 can be positioned on the shaft 9*r* between the second end of the spring 9*s* and the second bracket 3*b*. The resistance mechanism 20 can also be positioned within the inner channel or cavity of the rotatable body of the roller 9ROL.

Figure 4:
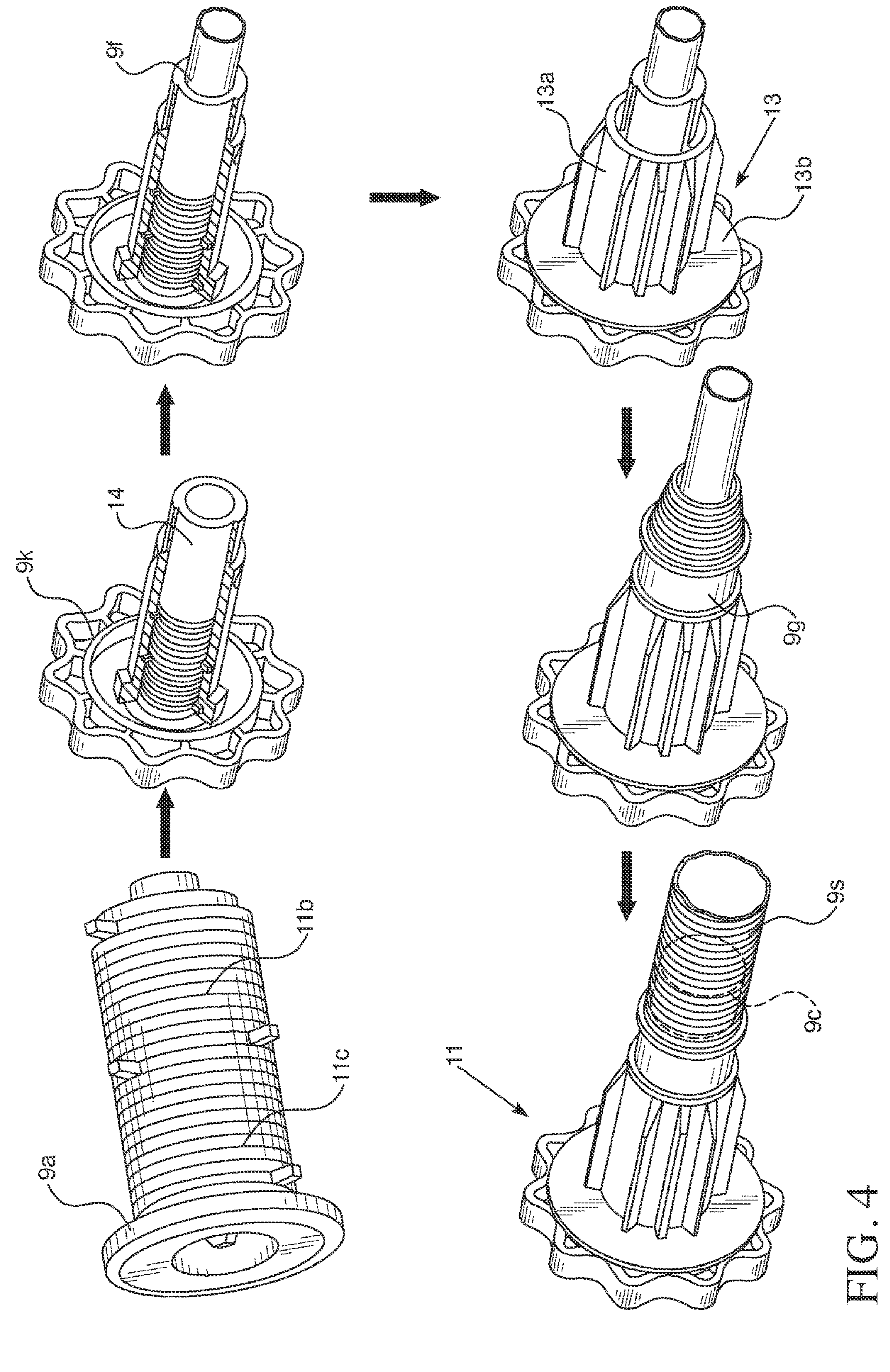
FIG. 4 is a flow chart illustrating an exemplary embodiment of an assembly process to form the exemplary embodiment of the tension adjustment mechanism of the window covering positional adjustment mechanism of the first exemplary embodiment of the window covering.
Figure 5:
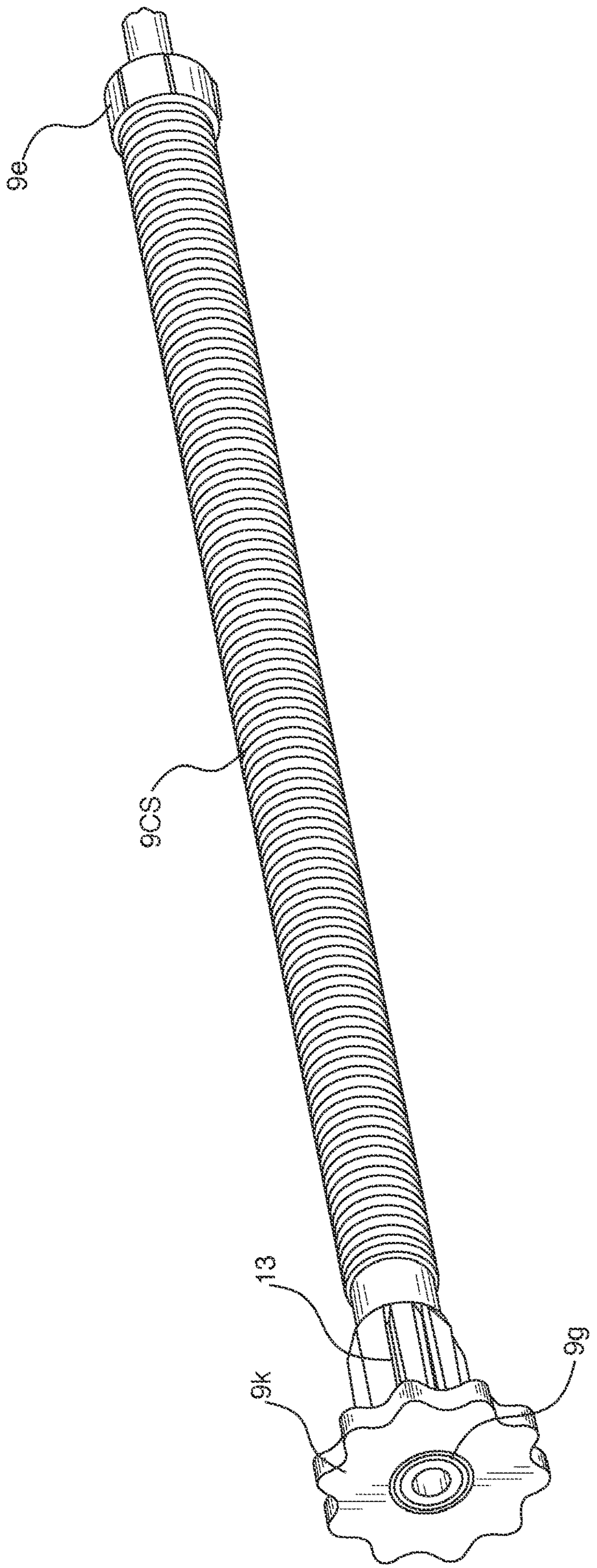
FIG. 5 is a perspective view of the exemplary embodiment of the window covering positional adjustment mechanism of the first exemplary embodiment of the window covering.
Figure 6:
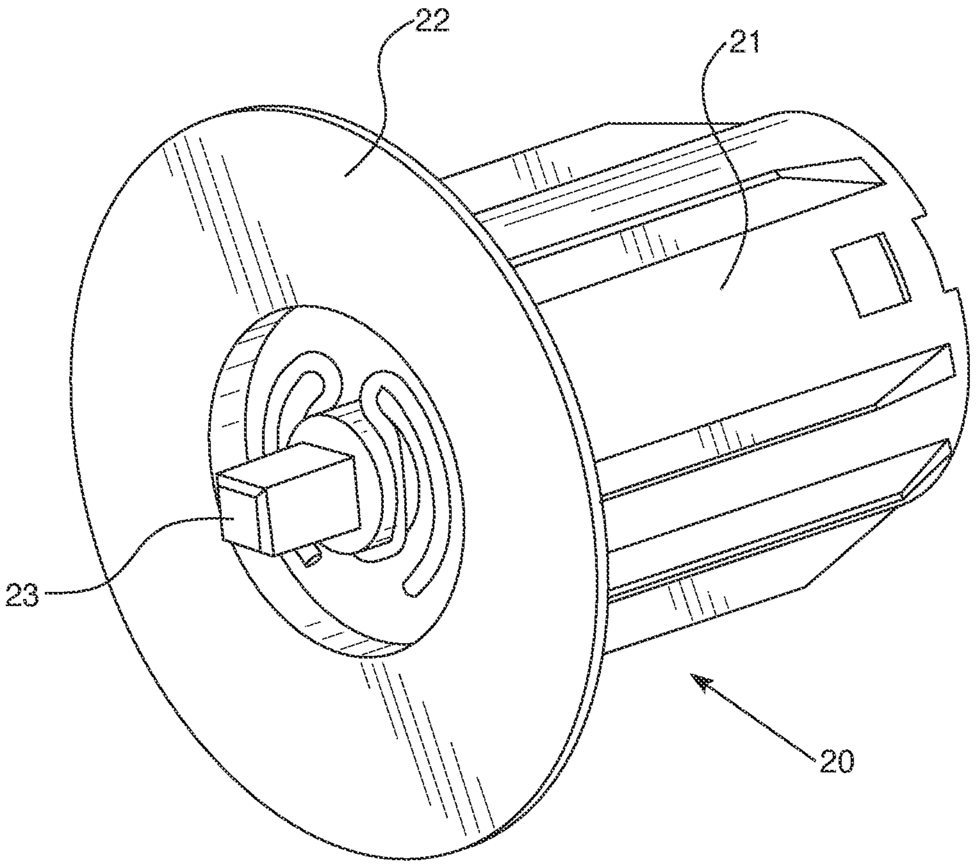
FIG. 6 is a perspective view of a resistance mechanism of the window covering positional adjustment mechanism of the first exemplary embodiment of the window covering.
Figure 7:
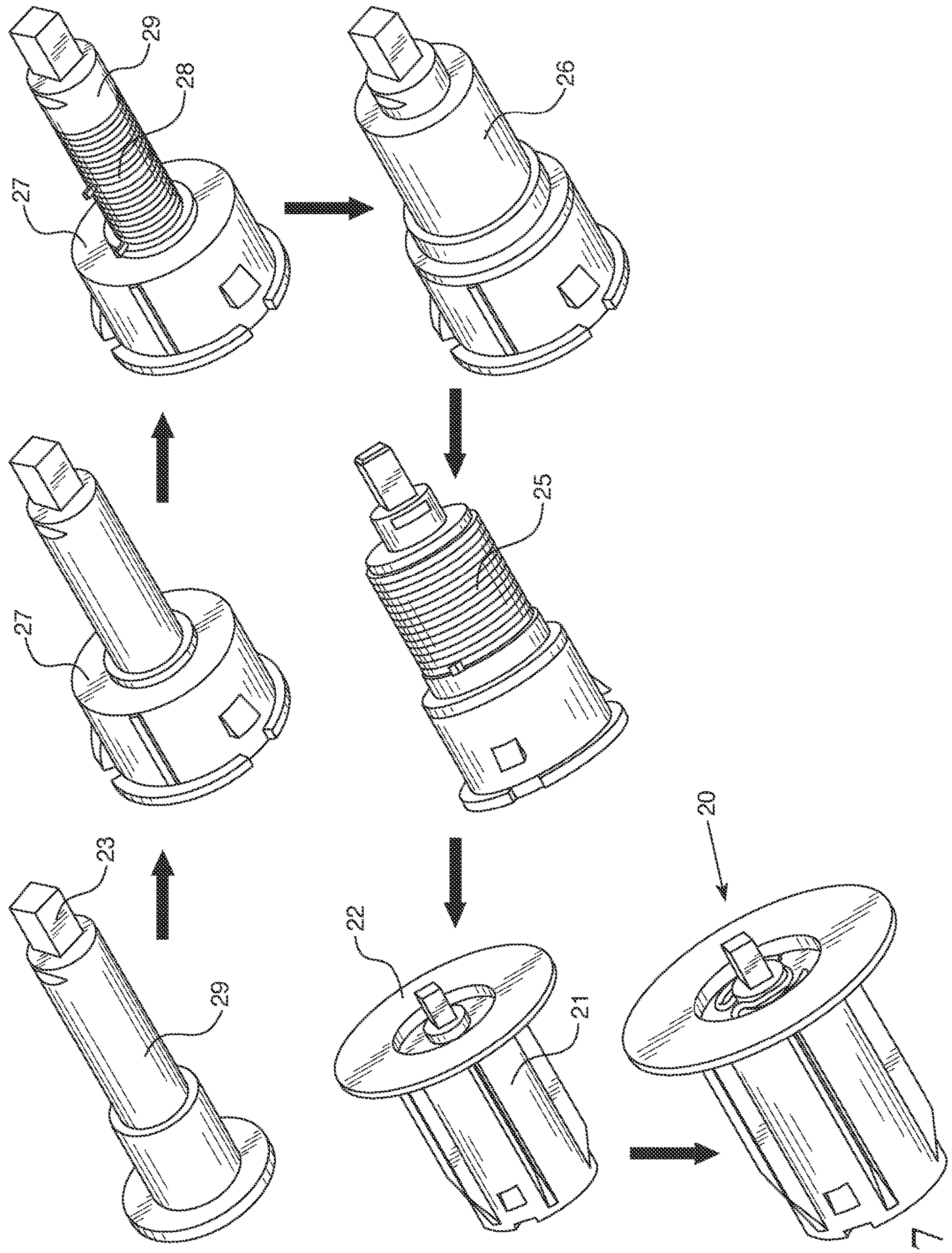
FIG. 7 is a flow chart illustrating an exemplary embodiment of an assembly process to form the exemplary embodiment of the resistance mechanism of the window covering positional adjustment mechanism of the first exemplary embodiment of the window covering.
Figure 8:
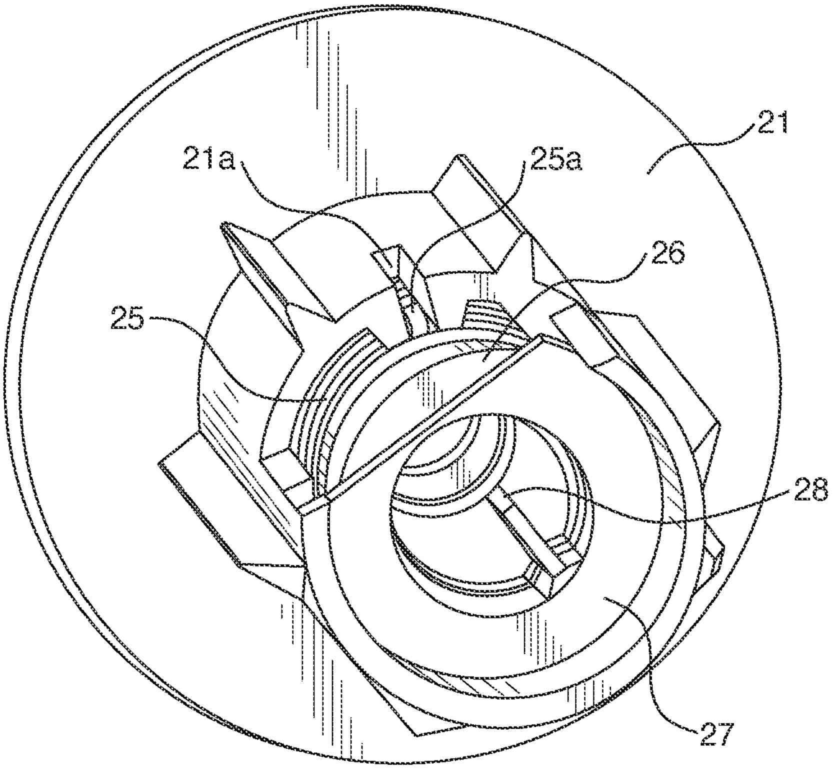
FIG. 8 is a fragmentary view illustrating components of the exemplary embodiment of the resistance mechanism of the window covering positional adjustment mechanism of the first exemplary embodiment of the window covering.
Figure 9:
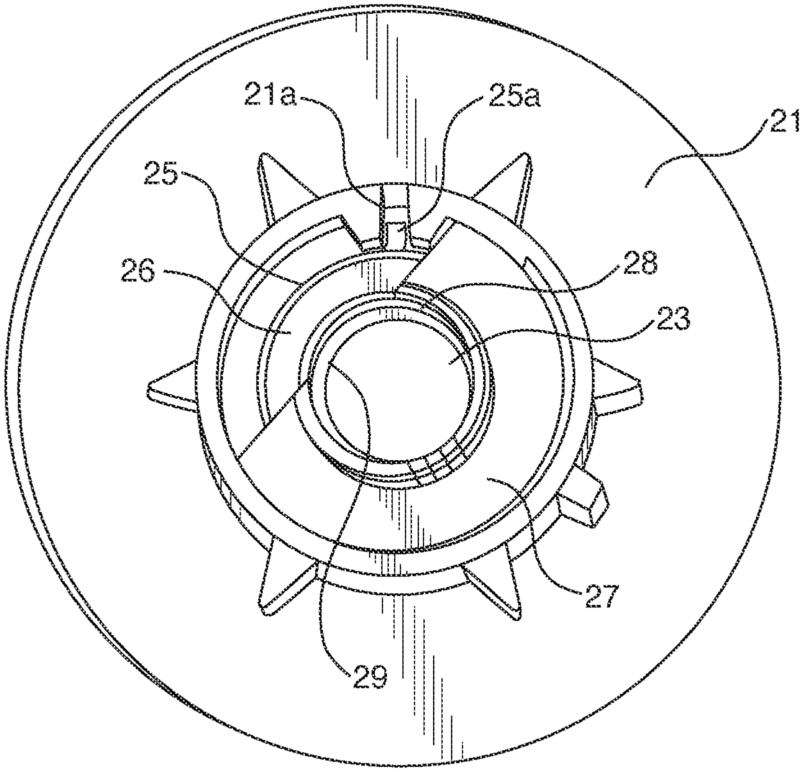
FIG. 9 is a fragmentary view illustrating components of the exemplary embodiment of the resistance mechanism of the window covering positional adjustment mechanism of the first exemplary embodiment of the window covering.
Figure 10:
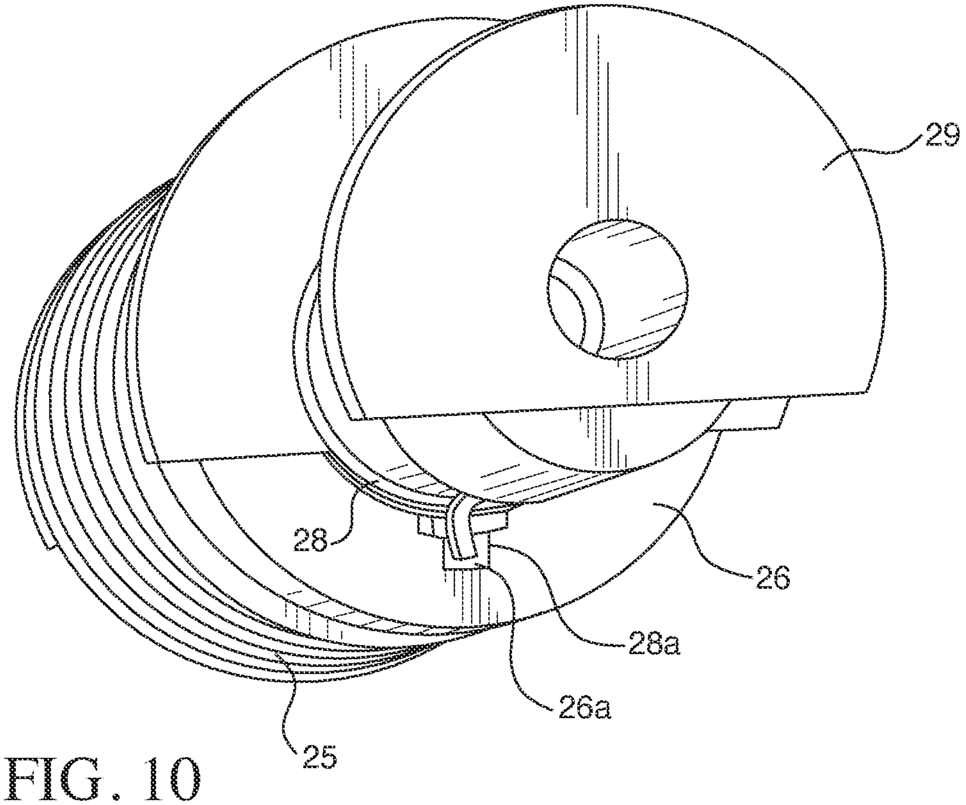
FIG. 10 is a fragmentary view illustrating components of the exemplary embodiment of the resistance mechanism of the window covering positional adjustment mechanism of the first exemplary embodiment of the window covering.
Figure 11:
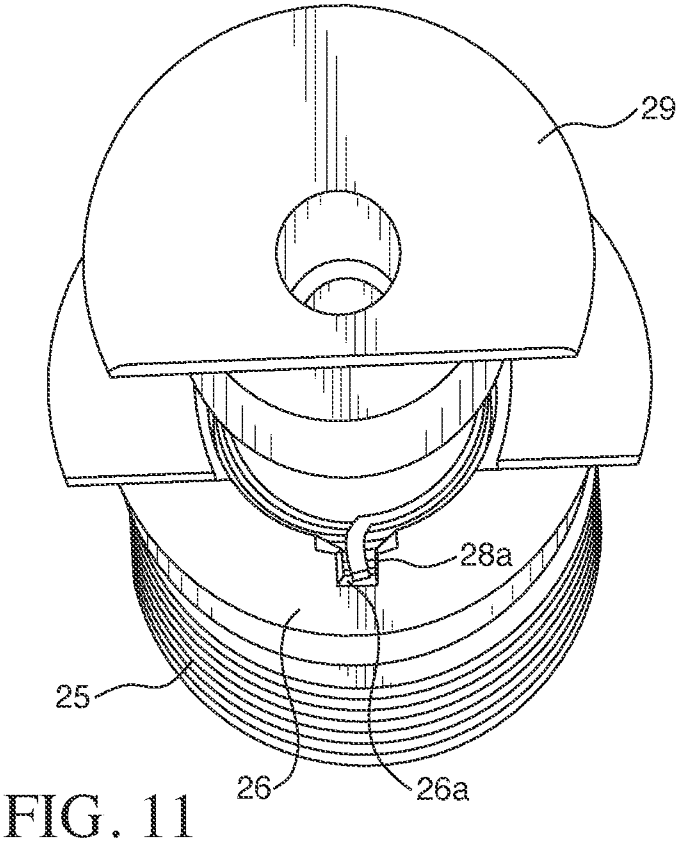
FIG. 11 is a fragmentary view illustrating components of the exemplary embodiment of the resistance mechanism of the window covering positional adjustment mechanism of the first exemplary embodiment of the window covering.
Figure 12:
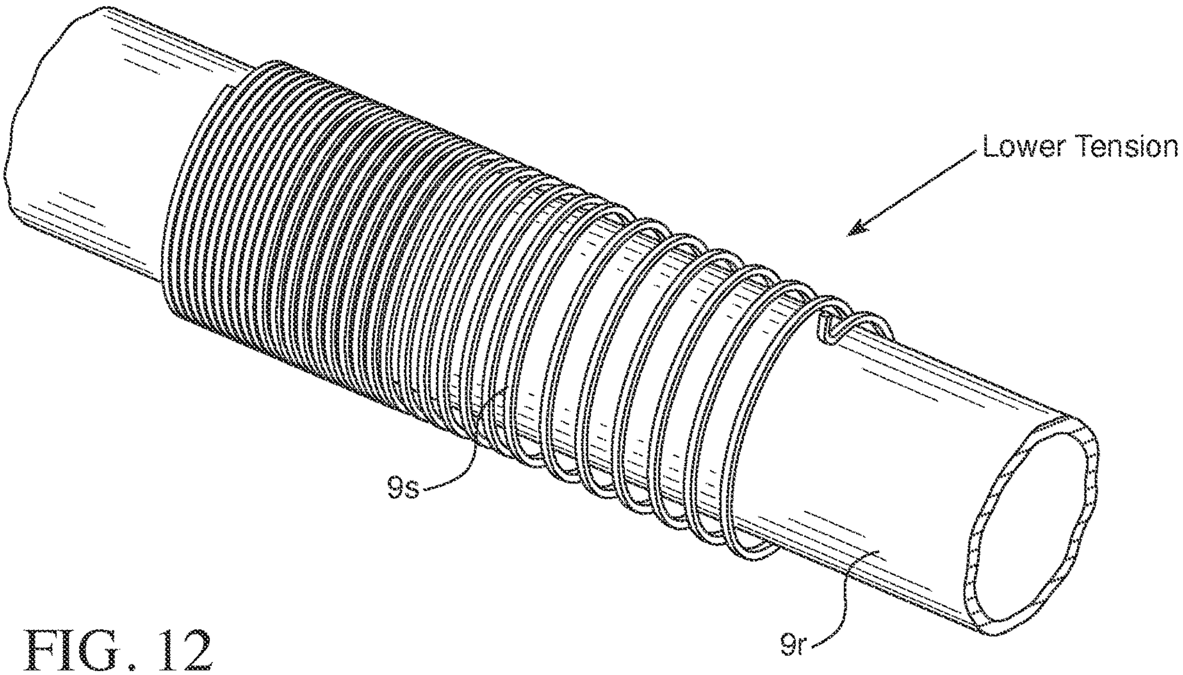
FIG. 12 is a schematic view illustrating an exemplary spring in a lower tension position, or lower tension orientation.
Figure 13:
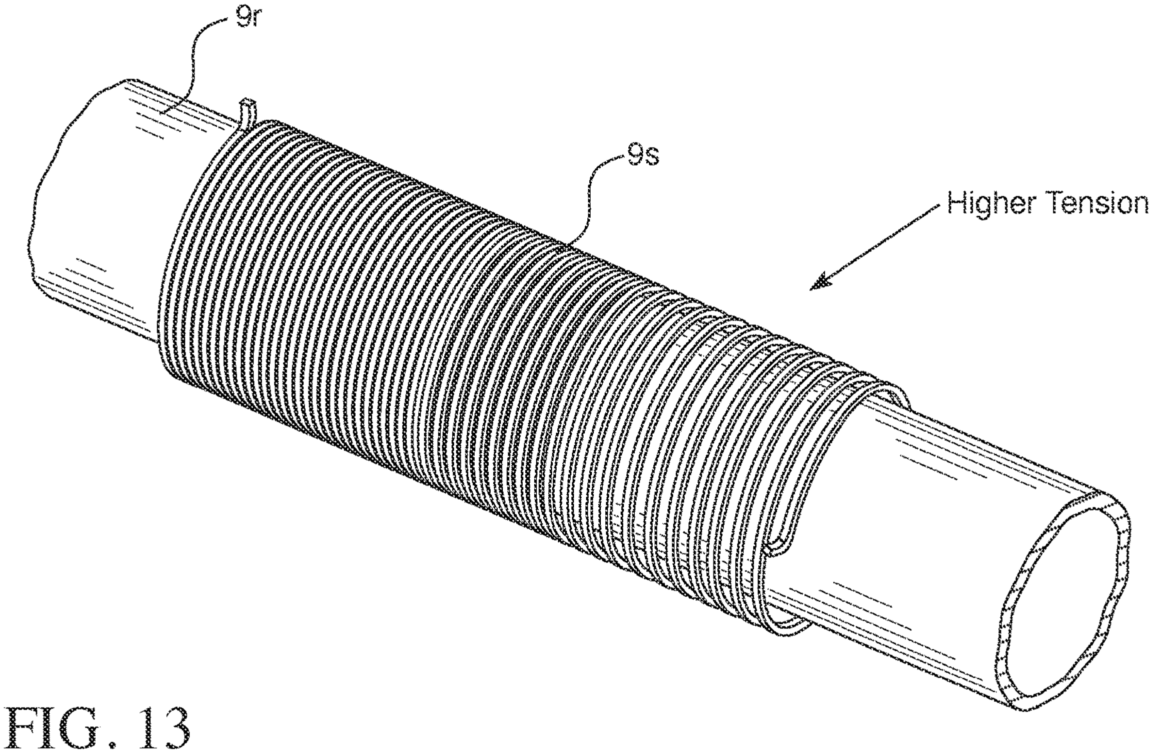
FIG. 13 is a schematic view illustrating the exemplary spring in a higher tension position, or higher tension orientation.

As may best be seen from FIGS. 3-5, the tension adjustment mechanism 11 can include a spring support body 9*a* that supports one or more torsion springs. Each torsion spring may include a coiled segment that defines an inner channel through which a portion of the spring support body 9*a* passes to support the torsion springs on the spring support body 9*a*. The one or more torsion springs can include a first torsion spring 11*a* and a second torsion spring 11*b*. Other embodiments may only utilize a single first torsion spring 11*a* while others can include additional torsion springs (e.g. a third torsion spring, a fourth torsion spring, etc.).

The spring support body 9*a* can be positioned within an inner channel of a spring retention body 14. A first end of the spring retention body 14 can be attached to an actuator 9*k*, which can be structured as an enlarge wheel, gear, or knob, for example. The second end of the spring retention body 14 can be insertable within an outer housing 13 for attachment to the shaft 9*r* adjacent the first end of the spring 9*s*. The housing can include a flange portion 13*b* that is positionable adjacent to or in engagement with the actuator 9*k* and an outer body portion 13*a* that defines a central or inner passageway to receive the torsion springs 11*a*, 11*b*, spring retention body 14, spring engagement member 9*f*, and spring support body 9*a* therein. The outer body portion 13*a* can be configured to engage an inner wall of the rotatable roller 9ROL of the position adjustment mechanism 9 so that rotation of the roller 9ROL from which the window covering material is extendible causes the housing outer body 13*a* to rotate in the same rotational direction as the roller 9ROL does when the roller 9ROL rotates.

The spring support body 9*a* can be within the inner channel of the spring retention body 14 so that the first and second torsion springs 11*a*, 11*b* are between the spring support body 9*a* and the spring retention body 14. A first distal end of the spring support body 9*a* can be within the spring retention body 14 at a position that is coincident with actuator 9*k* and within an inner opening or central opening of the actuator 9*k* as may best be seen form FIG. 5, for example. A second distal end of the spring support body 9*a* can be within the spring retention body 14 and within the housing 13 between a moveable collar 9*g* attached to the shaft 9*r* and the housing 13.

The moveable collar 9*g* can be attached to a spring engagement member 9*f* that can extend through a cavity of the housing 13 and along an opening of the spring retention body 14 for engagement with one or more tangs of the first torsion spring 11*a* and one or more tangs of the second torsion spring 11*b*. The positioning of the spring engagement member 9*f* can be configured so that rotation of the actuator 9*k* can cause the spring retention body 14, housing 13, spring engagement member 9*f* and collar 9*g* to rotate to move along a portion of the length of the shaft 9*r*. The motion can result in the collar 9*g* moving toward the spring 9*s* when the actuator 9*k* is rotated in a first rotational direction (e.g. clockwise or counterclockwise) and can result in the collar moving away from the spring 9*s* when the actuator 9*k* is rotated in an opposite second rotational direction (e.g. counterclockwise when the first rotational direction is clockwise or clockwise when the first rotational direction is counterclockwise). The motion along the length of the shaft 9*r* of the moveable collar 9*g* can adjust the tension of the spring 9*s*. The torsion spring engagement between the spring engagement member 9*f* and the first and second torsion springs 11*a*, 11*b* can help prevent the increased tension of the spring 9*s* from moving the collar 9*g* back to its initial position. The torsion spring engagement with the collar 9*g* provided via the spring engagement member 9*f* can help maintain the collar in the user selected position for pre-tensioning of the spring 9*s* to a user selected position between the high tension position and low tension position. Examples of the spring orientation and pre-tension at lower and higher tension positions that can be effected via rotation of the actuator 9*k* may best be appreciated from FIGS. 12 and 13.

The adjustment in pre-tension of the spring 9*s* can result in the spring 9*s* providing a greater or lesser counterbalance force during positional adjustment of the window covering material 7. At a lower tension position, less force may be applied by the spring 9*s* as the window covering material is extended or retracted as compared to the force provided by the spring 9*s* when it is at a higher tension position. The change in exerted force can affect the entirety of the retraction and extension motion of the window covering material as the change in pre-tension can affect the force provided by the spring 9*s* at all times while the window covering material position is adjusted or maintained at various locations between fully retracted and fully extended positions.

Similarly, at the higher tension position, more force can be applied by the spring 9*s* as the window covering material 7 is retracted or extended as compared to the force provided by the spring when it is at a lower tension position. This type of change in exerted force can also affect the entirety of the retraction and extension motion of the window covering material as the change in pre-tension can affect the force provided by the spring 9*s* at all times while the window covering material position is adjusted or maintained at various locations between fully retracted and fully extended positions.

The positional adjustment mechanism 9 in some embodiments can also include a moveable nut 9*c* that can move along the shaft 9*r*. the moveable nut can be attached to an end of the spring and can rotate to move along a length of the shaft 9*r* when the rotatable roller 9ROL is rotated during window covering material adjustment to further adjust a tension of the spring 9*s* as the window covering material is retracted or extended by being wound upon the rotatable roller 9ROL so that less force is exerted by the spring when more of the shade is retracted (or raised) to maintain the position of the shade while more force can be provided when the window covering material is extended and unwound from the rotatable roller 9ROL for example. The moveable nut's first, initial position can be defined by the position of the collar 9*g* to effect the pre-tensioning of the spring 9*s* and minimal level of force that may be provided by the spring 9*s* to adjust that minimal amount of force. Such adjustability can permit the same spring to be utilizable for various different types of window covering material having different weights as well as accounting for user preference.

The second end of the spring 9*s* opposite the first end connected to the moveable nut 9*c* can be attached to or engaged to a non-moveable collar 9*e* attached to the shaft 9*r* for positioning within the rotatable roller 9ROL. The non-moveable collar 9*e* can be positioned such that the rotatable roller 9ROL can rotate relative to the shaft 9*r* and non-moveable collar 9*e* attached to the shaft 9*r*.

The resistance mechanism 20 can be positioned adjacent to the non-moveable collar 9*e* so that the resistance mechanism 20 is between the second end of the spring 9*s* and the second bracket 3*b* and is also between the second bracket 3*b* and the non-moveable collar 9*e*. The resistance mechanism 20 can include an outer flange 22 attached to a housing 21. A projection 23 can extend from an inner opening of the flange 22 and housing 21 for engagement with the second bracket 3*b* and/or attachment to the second bracket 3*b*. The housing 21 can be sized to engage an inner wall of the rotatable roller 9ROL of the position adjustment mechanism 9 so that rotation of the roller 9ROL from which the window covering material is extendible causes the housing 21 to rotate in the same rotational direction as the roller 9ROL does when the roller 9ROL rotates.

The inner opening of the housing 21 can receive a first torsion spring 25, a first torsion spring support 26 on which the first torsion spring 25 is positionable, one or more second torsion springs 28, and a second torsion spring support 29 on which the one or more second torsion springs 28 are positioned so that the one or more second torsion springs 28 are positioned between the first torsion spring support 26 and the second torsion spring support 29 and the first torsion spring support 26 is positioned between the one or more second torsion springs 28 and the first torsion spring 25.

The second torsion spring support 29 can be positioned so that the second torsion spring support 29 does not rotate such that the second torsion spring support 29 can function as an axle about which the housing 21 can rotate. The second torsion spring support 29 can include an inner passageway for connecting to the shaft 9*r* and/or for attachment to a stub 23 or other type of stub-like projection that can be inserted within an opening of the second bracket 3*b* for attachment to the second bracket 3*b*.

The resistance mechanism 20 can also include a housing connector 27 that is configured to abut an inner side portion of the second torsion spring support 29 adjacent to or at a distal flange of the inner side portion of the second torsion spring support 29. The housing connector 27 can include a central opening through which an elongated portion of the second torsion spring support 29 extends. The housing connector 27 can also include projections that are sized and configured to pass into holes defined in the housing 21 for interlocking with the housing 21 to attach the housing connector 27 to the housing 21 and permit the housing 21 to rotate about the second torsion spring support 29. Connection of the housing connector 27 to the housing can integrate the resistance mechanism assembly so that the first and second torsion springs 25, 28 are positioned within the inner opening of the housing 21 for attachment to the rotatable roller 9ROL so that the tension mechanism 20 can rotate about shaft 9*r* at the same time and in the same direction as the rotatable roller 9ROL when the rotatable roller 9ROL rotates when the window covering material is moved (e.g. retracted or extended).

The housing connector 27 can have an inner opening that is sized and shaped to facilitate receipt and positioning therein of the second torsion spring support 29 and also receive and retain a side of the first torsion spring support 26 or interlock, abut, engage, or be attached to that side of the second torsion spring support 29 such that the second torsion spring support 29 having one or more second torsion springs 28 positioned thereon is positionable within the inner opening of the first torsion spring support 26 so that the first torsion spring support 26 is between the first torsion spring 25 positioned thereon and one or more second torsion springs 28 positioned on the second torsion spring support 29 within the inner passageway of the housing 21.

The housing 21 can include a slot 21*a* defined therein that is in communication with the inner passageway in which the first torsion spring is positioned. At least one tang 25*a* of the first torsion spring 25 can be positioned within the slot 21*a* and be moveable within the slot 21*a* between an engaged position in which the tang 25*a* contacts the housing 21 body that defines a second side of the slot 21*a* (see FIG. 8) and a non-engaged position in which the tang 25*a* is within the slot 21*a* and not in contact with the housing body and/or is in the slot 21*a* and contacting the housing body defining a first side of the slot 21*a* that is opposite the second side of the slot 21*a* (see FIG. 9). When the tang 25*a* is in the engaged position, the tang 25*a* can apply a force from the first torsion spring 25 onto the housing 21 to apply a drag force to the housing 21 that can require additional force to be applied to overcome this drag force for rotation of the housing 21 driven by rotation of the rotatable roller 9ROL on which the window covering material is wound on during retraction. This drag force can be a first drag force applied on rotation of the roller 9ROL for window covering material adjustment during retraction (e.g. for raising the window covering material into an open position or raising the window covering material 7 toward an open position or fully retracted position). The first drag force can also be considered a retraction drag force.

The slot 21*a* and tang 25*a* can be arranged so that rotation of the housing in the second rotational direction for window covering material retraction (which can occur when the roller 9ROL rotates in the second rotational direction for retraction of the window covering material) causes the tang 25*a* to move to an engaged position against a second sidewall of the housing defining the second side of the slot 21*a* and rotation of the housing in the first rotational direction for window covering material extension causes the tang 25*a* to move out of engagement with the housing 21 and be in the slot 21*a* without contacting the sidewalls of the slot 21*a* and/or to be in the slot 21*a* and in contact with the first sidewall that defines the slot 21*a* that is opposite the second sidewall such that the first torsion spring 25 is disengaged from the housing 21 and in a low tension position so that it no longer applies the first drag force (or retraction drag force). The disengagement of the one or more first torsion springs 25 can be due to the orientation and compressibility of the spring(s) 25 and tang(s) 25*a* so that contacting the first sidewall (for embodiments where rotation results in such contacting) does not incur application of a significant force from the spring(s) 25 that can function as a drag force on rotation of the roller 9ROL. The positioning and interlockable shapes of the housing 21, first torsion spring support 26, second torsion spring support 29, and housing connector 27 can help define the path of travel for the first tang 25*a* within the slot 21*a* between the engaged and non-engaged positions that can occur via rotation of that housing 21.

The one or more second torsion springs 28 can also have at least one tang 28*a* positionable within a slot 26*a* of the first torsion spring support 26. Each tang 28*a* can be moveable within the slot 26*a* between an engaged position in which the tang 28*a* contacts the inner side of the first torsion spring support's body that defines a first side of the slot 26*a* (see FIG. 10) and a non-engaged position in which the tang 28*a* is within the slot 26*a* and not in contact with the body of the first torsion spring support 26 and/or in contact with the portion of the body of the first torsion spring support 26 that defines the second side of the slot 26*a* (see FIG. 11). When the tang 28*a* is in the engaged position, the tang 28*a* can apply a force from the second torsion spring 28 onto the housing 21 via the connection the first torsion spring support 26 has to the housing 21 provided by the housing connector 27 to apply a drag force to the housing 21 that can require additional force to be applied to overcome this drag force for rotation of the housing 21 driven by rotation of the rotatable roller 9ROL on which the window covering material is unwound from during extension. This drag force can be a second drag force applied on rotation of the roller 9ROL for window covering material adjustment during extension (e.g. for lowering the window covering material into a closed position or lowering the window covering material 7 closer to the closed position or fully extended position). The second drag force can also be considered an extension drag force.

The slot 26*a* and tang 28*a* can be arranged so that rotation of the housing 21 in the first rotational direction (which can occur as a result of rotation of the roller 9ROL) for window covering material extension causes the tang 28*a* of each second torsion spring 28 to move to an engaged position against a first sidewall of the first torsion spring support 26 defining a first side of the slot 26*a* and rotation of the housing 21 in a second rotational direction (which can occur when the rotatable roller 9ROL rotates in the second rotational direction) for window covering material retraction causes the tang 28*a* to move out of engagement with the body of the first torsion spring support 26 and be in the slot 26*a* without contacting any of the sidewalls of the slot 26*a* and/or by contacting a second sidewall that defines the second side of the slot 26*a* that is opposite the first sidewall of the slot 26*a* such that each second torsion spring 28 is disengaged from the housing 21 and no longer applies the second drag force. The disengagement of the one or more second torsion springs 28 can be due to the orientation and compressibility of the spring(s) 28 and tang(s) 28*a* so that contacting the second sidewall (for embodiments where rotation results in such contacting) does not incur application of a significant force from the spring(s) 28 during rotation of the roller 9ROL. The positioning and interlockable shapes of the housing 21, first torsion spring support 26, second torsion spring support 29, and housing connector 27 can help define the path of travel for the tang 28*a* within the slot 26*a* between the engaged and non-engaged positions that can occur via rotation of that housing 21.

The motion and adjustment of the tangs 25*a* and 28*a* of the first and second torsion springs 25 and 28 can occur at the same time so that the resistance mechanism 20 applies either the first drag force or the second drag force during rotation of the roller 9ROL on which the window covering material is wound on (during retraction) or unwound from (during extension). The movement of the tangs 25*a*, 28*a* can be driven via rotation of the roller 9ROL via the connection the housing 21 has with the roller 9ROL such that the housing 21 and roller 9ROL rotate in the same direction at the same time. The size, shape, number of torsion springs, and material properties of the springs can be configured so that the drag force applied by the at least one first torsion spring 25 when in their (or its) engaged position is less than the drag force applied by the one or more second torsion springs 28 when in their (or its) engaged position.

It should be understood that different embodiments of my window covering may include different elements to meet different sets of design criteria. For instance, lift cords (if used) could be cords, cord segments of the same cord, polymeric filaments, tape, or other type of flexible elongated members. The window covering material can include slats on ladders for a venetian blind configuration or can be comprised of pleated material, cellular material, shade material, or other type of window covering material. As yet another example, some embodiments of the window covering may not utilize a bottom rail or may be configured as a top down bottom up shade having a headrail, bottom rail, and a middle rail that is between the headrail and bottom rail that is moveable relative to the headrail and the bottom rail via a middle rail positional control mechanism (e.g. a spring motor unit or cord lock, etc.). As another example, the at least one first torsion spring 25 can include multiple first torsion springs 25 that each have at least one tang 25*a* moveable within the slot 21*a*. Similarly, when there are more than one second torsion springs 28, each of the second torsion springs 28 can include a tang 28*a* positionable within the slot 26*a* of the first torsion spring support 26. As yet another example, the size and shape of various elements can be adjusted to account for a particulate type of size, dimension, or component structural property that may be desired to meet a particular set of design criteria.

Thus, while certain exemplary embodiments of a window covering, a window covering positional adjustment mechanism, a tension adjustment mechanism for a window covering positional adjustment mechanism, a resistance mechanism or a window covering positional adjustment mechanism, and methods of making and using the same have been shown and described above, it is to be distinctly understood that the invention is not limited thereto but may be otherwise variously embodied and practiced within the scope of the following claims.

What is claimed is:

1. A window covering comprising:

a rotatable roller rotatable in a first rotational direction and a second rotational direction, the rotatable roller being mountable adjacent to a window;

window covering material attached to the rotatable roller such that rotation of the rotatable roller in the first rotational direction extends the window covering material from the rotatable roller toward a fully extended position and rotation of the rotatable roller in the second rotational direction retracts the window covering material toward a fully retracted position;

a positional adjustment mechanism positioned in the rotatable roller, the positional adjustment mechanism having a spring, the positional adjustment mechanism comprising at least one of: comprises:

a resistance mechanism configured to apply an extension drag force to the rotatable roller during rotation in the first rotational direction and a retraction drag force to the rotatable roller during rotation in the second rotational direction;

wherein the resistance mechanism comprises:

a housing;

a first torsion spring within an inner passageway of the housing;

a first torsion spring support on which the first torsion spring is positionable within the inner passageway;

at least one second torsion spring;

a second torsion spring support on which the at least one second torsion spring is positioned such that the at least one second torsion spring is between the second torsion spring support and the first torsion spring support and the first torsion spring support is between the first torsion spring and the at least one second torsion spring.

2. The window covering of claim 1, wherein the positional adjustment mechanism also includes a tension adjustment mechanism connected to the spring of the positional adjustment mechanism to adjust a pre-tension of the spring from between a first tension position and a second tension position, the second tension position being a higher tension position than the first tension position.

3. The window covering of claim 2, wherein the tension adjustment mechanism has a rotatable actuator that is rotatable to adjust the pre-tension of the spring of the positional adjustment mechanism.

4. The window covering of claim 2, wherein the retraction drag force is applied via the first torsion spring during rotation of the rotatable roller in the second rotational direction and the extension drag force is applied via the at least one second torsion spring during rotation of the rotatable roller in the first rotational direction, the extension drag force being greater than the retraction drag force.

5. The window covering of claim 2, wherein the tension adjustment mechanism has a rotatable actuator that is rotatable to adjust the pre-tension of the spring of the positional adjustment mechanism from between the first tension position and the second tension position, rotation of the actuator in a first direction adjusting the pre-tension of the spring toward the first tension position and rotation of the actuator in a second direction adjusting the pre-tension of the spring toward the second tension position.

6. The window covering of claim 5, wherein at least one torsion spring is positioned between the actuator and the spring of the positional adjustment mechanism to effect adjustment of the pre-tension of the spring via rotation of the actuator.

7. The window covering of claim 6, wherein the at least one torsion spring of the tension adjustment mechanism is connected to a moveable collar that is moved via rotation of the actuator to adjust the pre-tension of the spring of the positional adjustment mechanism.

8. The window covering of claim 1, wherein:

the at least one second torsion spring has a tang that is positionable within a slot of the first torsion spring support and is moveable within the slot of the first torsion spring support between an engaged position and a disengaged position;

the at least one first torsion spring has a tang that is positionable within a slot of the housing and is moveable within the slot of the housing between an engaged position and a disengaged position;

wherein the at least one second torsion spring is movable to the engaged position of the at least one second torsion spring and the first torsion spring is moveable to the disengaged position of the first torsion spring when the rotatable roller rotates in the first rotational direction to extend the window covering material; and the at least one second torsion spring is movable to the disengaged position of the at least one second torsion spring and the first torsion spring is moveable to the engaged position of the first torsion spring when the rotatable roller rotates in the second rotational direction to retract the window covering material.

9. The window covering of claim 8, wherein the retraction drag force is applied via the first torsion spring during rotation of the rotatable roller in the second rotational direction and the extension drag force is applied via the at least one second torsion spring during rotation of the rotatable roller in the first rotational direction, the extension drag force being greater than the retraction drag force.

10. A window covering positional adjustment mechanism positionable in a rotatable roller, the positional adjustment mechanism comprising:

a coil spring:

(i) a resistance mechanism positionable within the rotatable roller and configured to apply an extension drag force to the rotatable roller during rotation of the rotatable roller in a first rotational direction and a retraction drag force to the rotatable roller during rotation of the rotatable roller in a second rotational direction;

wherein the resistance mechanism comprises:

a housing;

a first torsion spring within an inner passageway of the housing;

a first torsion spring support on which the first torsion spring is positionable within the inner passageway;

at least one second torsion spring;

a second torsion spring support on which the at least one second torsion spring is positioned such that the at least one second torsion spring is between the second torsion spring support and the first torsion spring support and the first torsion spring support is between the first torsion spring and the at least one second torsion spring.

11. The window covering positional adjustment mechanism of claim 10, wherein the positional adjustment mechanism includes a tension adjustment mechanism connected to the coil spring of the positional adjustment mechanism to adjust a pre-tension of the coil spring from between a first tension position and a second tension position, the second tension position being a higher tension position than the first tension position.

12. The window covering positional adjustment mechanism of claim 11, wherein the tension adjustment mechanism has a rotatable actuator that is rotatable to adjust the pre-tension of the coil spring from between the first tension position and the second tension position.

13. The window covering positional adjustment mechanism of claim 11, wherein the retraction drag force is applied via the first torsion spring during rotation of the rotatable roller in the second rotational direction and the extension drag force is applied via the at least one second torsion spring during rotation of the rotatable roller in the first rotational direction, the extension drag force being greater than the retraction drag force.

14. The window covering positional adjustment mechanism of claim 10, wherein the tension adjustment mechanism has a rotatable actuator that is rotatable to adjust the pre-tension of the coil spring from between the first tension position and the second tension position, rotation of the actuator in a first direction adjusting the pre-tension of the coil spring toward the first tension position and rotation of the actuator in a second direction adjusting the pre-tension of the coil spring toward the second tension position.

15. The window covering positional adjustment mechanism of claim 14, wherein at least one torsion spring is positioned between the actuator and the coil spring of the positional adjustment mechanism to effect adjustment of the pre-tension of the coil spring via rotation of the actuator.

16. The window covering positional adjustment mechanism of claim 15, wherein the at least one torsion spring is connected to a moveable collar that is moved via rotation of the actuator to adjust the pre-tension of the coil spring of the positional adjustment mechanism.

17. The window covering positional adjustment mechanism of claim 10, wherein:

the at least one second torsion spring has a tang that is positionable within a slot of the first torsion spring support and is moveable within the slot of the first torsion spring support between an engaged position and a disengaged position;

the at least one first torsion spring has a tang that is positionable within a slot of the housing and is moveable within the slot of the housing between an engaged position and a disengaged position;

the at least one second torsion spring is movable to the engaged position of the at least one second torsion spring and the first torsion spring is moveable to the disengaged position of the first torsion spring when the rotatable roller rotates in a first rotational direction to extend the window covering material; and the at least one second torsion spring is movable to the disengaged position of the at least one second torsion spring and the first torsion spring is moveable to the engaged position of the first torsion spring when the rotatable roller rotates in a second rotational direction to retract the window covering material.

18. The window covering positional adjustment mechanism of claim 17, wherein the retraction drag force is applied via the first torsion spring during rotation of the rotatable roller in the second rotational direction and the extension drag force is applied via the at least one second torsion spring during rotation of the rotatable roller in the first rotational direction, the extension drag force being greater than the retraction drag force.

* * * * *